No. 859,419. PATENTED JULY 9, 1907.
W. H. WEBB, W. G. BRETTELL & A. J. ADAMSON.
GAS COMPRESSOR.
APPLICATION FILED OCT. 3, 1905.

2 SHEETS—SHEET 1.

Fig. 1.

WITNESSES
Wallace Root
John A. Percival

INVENTORS
Walter Henry Webb
William George Brettell
Alexander John Adamson
by Richardson
Attys No. 859,419. PATENTED JULY 9, 1907.
W. H. WEBB, W. G. BRETTELL & A. J. ADAMSON.
GAS COMPRESSOR.
APPLICATION FILED OCT. 3, 1905.
2 SHEETS—SHEET 2.
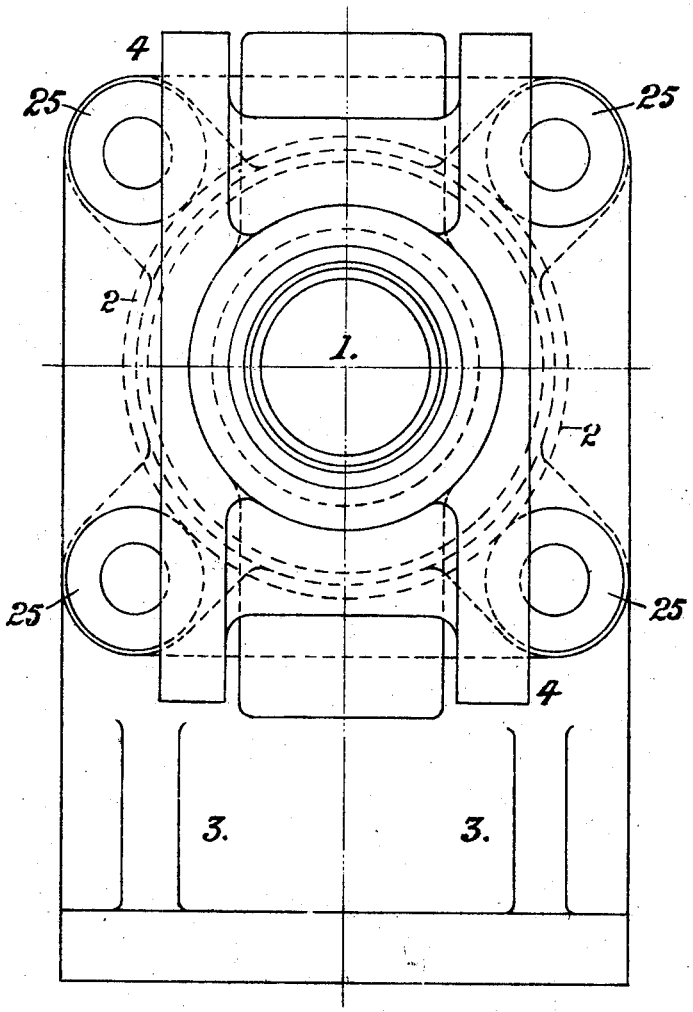
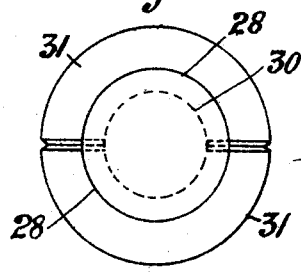

UNITED STATES PATENT OFFICE.

WALTER HENRY WEBB, WILLIAM GEORGE BRETTELL, AND ALEXANDER JOHN ADAMSON, OF LIVERPOOL, ENGLAND.

GAS-COMPRESSOR.

No. 859,419.  Specification of Letters Patent.  Patented July 9, 1907.

Application filed October 3, 1905. Serial No. 281,120½.

*To all whom it may concern:*

Be it known that we, WALTER HENRY WEBB, WILLIAM GEORGE BRETTELL, and ALEXANDER JOHN ADAMSON, subjects of the King of England, residing at Liverpool, in the county of Lancaster, England, have invented new and useful Improvements in or Connected with Gas-Compressors, of which the following is a specification.

This invention has reference to gas compressors, in which compression is carried to exceedingly high degree, as is the case in the compression of carbonic anhydrid ($C.O_2$), for the purpose of liquefying same for the production of "cold" for refrigerative purposes.

The compression cylinders and pistons of high pressure carbonic anhydrid compressors of refrigeration machinery wear un-uniformly, due to the bending of the cylinder and vibration; and the object and effect of this invention is to obviate these defects simply and inexpensively, and at the same time provide a construction which admits of the ready fitting of the valves and other parts.

The invention will be described with reference to the accompanying drawings, in which Figure 1 is a longitudinal section of the compressor; and Fig. 2 is an outside end view of same, Fig. 3 is an end view of the piston.

The main compression cylinder barrel 1, in which the piston works, is of steel, and fixed within an outer supporting cylinder 2 preferably of cast iron, and having a base 3 which is adapted to be fastened onto the bed-plate of the compressor, such base 3 extending practically the whole length of the cylinder.

The cylinder front cover 4, and the back cover 5, are separate from the cylinder, and carry in them the inlet valves 6, and outlet valves 7. The front end 4 is provided with a screw plug 8, carrying the gland packing, and the other cover 5 is provided with a plug 9. The bores of the covers 4, 5, form a part of the cylinder bore in which the ends of the piston work, they being continuous with the cylinder bore.

The covers 4, 5, are provided on their inner faces with an annular projection 10 and 11, respectively; and a corresponding groove is provided, partly in the end of the supporting cylinder 2, and partly in the barrel 1, to receive these projections 10, 11, a joint being made between the end of the barrel 1, and the covers 4, 5, within the projections 10, 11, by the meeting of the two faces, which are tooled, or by a jointing between them.

The piston 12 has its packing rings—hereinafter described—so arranged in it, that at the ends of the stroke, the end packing ring will just reach, or nearly reach, the end of the barrel 1; while the ends of the piston beyond these rings, in each direction, are made to fill up the spaces in the covers 4 and 5, beyond the joints just described, to avoid clearance; but these parts of the piston do not work in contact with same, being slightly smaller in diameter.

The case cylinder 2, is bored internally (it being provided on the outside with recesses and ribs as shown), and the inner barrel 1 is bored externally, and these bored and turned surfaces are made to fit truly one with the other.

The inlet valves 6, which are of the lift type, are supported in cages 14, the upper edge of which, forms the valve seat; and these cages are provided with upper and lower shoulders 15 and 16, while the space in the covers 4, 5, in which these cages fit, is correspondingly formed with shoulders, as shown, and between the two sets of shoulders, packing rings are provided. These shoulders and joints come one above and one below the inlet passage 17 for gas, leading into the interior of the cage 14.

When the cage 14 is forced into position, which is done by a solid metal screw gland 18 screwing into the cylinder ends, a tight joint is made between the said shoulders 15, 16, and the corresponding shoulders in the cylinder ends. On the other hand, by slacking back the screw gland 18, it acts on a nut or head 13 on the end of the shank 19 of the cage 14, and this cage is released, and can be thereby readily withdrawn for inspection, repairs, or otherwise.

The delivery valves 7 work in cages 20 in the cylinder ends 4, 5, such cages being screwed into the cylinder ends.

The gas inlet and outlet passages 17 and 21 to the valves 6 and 7 in the cylinder ends 4, 5, lead into holes 22, 23, bored transversely through same.

The cylinder ends 4 and 5, are fastened to the cylinder outer case 2 by bolts, which pass through lugs 25, 26, on the ends 4, 5, and the cylinder case 2, respectively.

With regard to the defects in connection with the pistons of compressors of the kind referred to, we have found the metallic packing herein shown and described, is most serviceable, lasting, and efficient, and obviates the difficulties hitherto experienced. In this piston 12, the body 28 is say made of steel in one with the piston rod 29, and it is recessed or turned down as shown; and in the tail has an annular recess 30, and within this recess, an inner flange of a diametrically divided ring 31 is fitted, for keeping the packing rings in position.

The packing rings consist of a plurality of hard brass or like solid rings 32, threaded over the body 28 of the piston, and a number of relatively small split steel rings 33 fitting in external recessses at one end of the rings 32. One edge of each of the split rings 33 lies against the shoulder of the internal angle of the rings 32, and the other against the outer edge of the next ring.

A split packing ring 34 is provided in the front of the first ring 32, and all the rings are made true, and scraped and fitted to make joint with one another along their several edges; and behind the last ring 32, there is a threaded solid ring 35 screwing onto the external threaded end portion of the piston; and then beyond this, is the divided holding ring 31, which being of the diameter of the cylinder barrel 1, is kept in position on the tail of the piston body.

The threaded ring 35 presses the rings 32 onto one another to the desired degree of tightness, so that no fluid can pass between them, either from the inside or from the outside.

What is claimed is:—

1. A high pressure gas compressor cylinder, built up of an inner barrel 1 of steel, and an outer cast casing 2, having a base 3 adapted to be fastened to the bed-plate of the compressor, the barrel 1 and casing 2 having an annular recess in their ends, and cylinder ends 4, 5, fitted on the ends of the cylinder parts 1, 2, and having on their inner face an annular projecting flange 10 and 11, fitting in the said annular recesses, each end having in it an inlet and discharge valve; and a bored part forming a continuation of the cylinder bore at each end; substantially as set forth.

2. A high pressure gas compressing cylinder comprising an inner barrel 1; an outer cast casing 2, having a base 3 cast with it, adapted to be fastened to the bed-plate of the compressor, and said cylinder and casing having annular grooves at their ends; separate end covers 4 and 5 with annular projections 10 and 11, fitting into the said annular grooves on the cylinder parts 1 and 2, and bored out to form a portion of the cylinder bore, and with inlet and outlet valves therein; and a piston 12 having a plain part at one end beyond the piston rings, adapted to work in connection with the bored part of the end cover 4, and at the other end a ring 31 divided diametrically in halves, and fitting in a recess at the end of the piston, and working in connection with the bored portion of the other cover 5; substantially as set forth.

In testimony whereof we have signed our names to this specification in the presence of two subscribing witnesses.

WALTER HENRY WEBB.
WILLIAM GEORGE BRETTELL.
ALEXANDER JOHN ADAMSON.

Witnesses:
S. GOODALL,
W. HARRISON.